United States Patent
Lu

(10) Patent No.: US 11,392,775 B2
(45) Date of Patent: Jul. 19, 2022

(54) SEMANTIC RECOGNITION METHOD, ELECTRONIC DEVICE, AND COMPUTER-READABLE STORAGE MEDIUM

(71) Applicant: Ping An Technology (Shenzhen) Co., Ltd., Guangdong (CN)

(72) Inventor: Chuan Lu, Guangdong (CN)

(73) Assignee: Ping An Technology (Shenzhen) Co., Ltd., Guangdong (CN)

(*) Notice: Subject to any disclaimer, the term of this patent is extended or adjusted under 35 U.S.C. 154(b) by 346 days.

(21) Appl. No.: 16/635,552

(22) PCT Filed: Feb. 27, 2018

(86) PCT No.: PCT/CN2018/077426
§ 371 (c)(1),
(2) Date: Jan. 31, 2020

(87) PCT Pub. No.: WO2019/062010
PCT Pub. Date: Apr. 4, 2019

(65) Prior Publication Data
US 2020/0257860 A1 Aug. 13, 2020

(30) Foreign Application Priority Data
Sep. 30, 2017 (CN) .......................... 201710928258.1

(51) Int. Cl.
*G06F 40/35* (2020.01)
*G06F 40/247* (2020.01)
(Continued)

(52) U.S. Cl.
CPC ............ *G06F 40/35* (2020.01); *G06F 40/247* (2020.01); *G06F 40/268* (2020.01); *G06N 5/04* (2013.01); *G10L 15/1815* (2013.01)

(58) Field of Classification Search
CPC ....... G06F 40/35; G06F 40/247; G06F 40/268
See application file for complete search history.

(56) References Cited

U.S. PATENT DOCUMENTS

| 10,380,149 B2* | 8/2019 | Torisawa ................ G06F 16/00 |
| 2012/0131060 A1* | 5/2012 | Heidasch ............ G10L 15/1822 |
| | | 707/E17.049 |

(Continued)

FOREIGN PATENT DOCUMENTS

| CN | 1512484 | 7/2004 |
| CN | 1936885 A | 3/2007 |

(Continued)

OTHER PUBLICATIONS

International Search Report and Written Opinion issued by WIPO for corresponding patent application No. PCT/CN2018/077426 dated Apr. 4, 2019.

(Continued)

*Primary Examiner* — Anne L Thomas-Homescu
(74) *Attorney, Agent, or Firm* — Renner, Otto, Boisselle & Sklar, LLP

(57) ABSTRACT

The application discloses a semantic recognition method, an electronic device and a computer-readable medium, belongs to a field of intention recognition. The semantic recognition method includes the following steps: S1, constructing a morpheme database; S2, constructing a synonym database; S3, receiving a service session request of a customer, and creating a customer service session; S4, analyzing contents of the customer service session to obtain a word sequence which only contains the standard words for expressing the customer service session; S5, determining a missing morpheme in the word sequence which only contains the standard words, and asking the customer a question to obtain a completely expressed word sequence which only contains the standard words; S6, according to the completely (Continued)

expressed word sequence which only contains the standard words, finding out a matched answer from the morpheme database and sending the matched answer to the customer.

16 Claims, 8 Drawing Sheets

(51) Int. Cl.
*G06F 40/268* (2020.01)
*G06N 5/04* (2006.01)
*G10L 15/18* (2013.01)

(56) References Cited

U.S. PATENT DOCUMENTS

| | | | | |
|---|---|---|---|---|
| 2015/0121136 | A1* | 4/2015 | Namkoong | G06F 11/079 714/15 |
| 2015/0286708 | A1* | 10/2015 | Tao | G06F 16/3344 707/730 |
| 2016/0012126 | A1* | 1/2016 | Franceschini | G06F 16/325 707/735 |
| 2016/0125013 | A1* | 5/2016 | Barborak | G06F 16/36 707/748 |
| 2016/0140958 | A1* | 5/2016 | Heo | G06F 40/30 704/9 |
| 2017/0140034 | A1* | 5/2017 | Kalyanpur | G06F 40/205 |
| 2021/0326714 | A1* | 10/2021 | Li | G06F 16/24573 |

FOREIGN PATENT DOCUMENTS

| | | | |
|---|---|---|---|
| CN | 102194005 | | 9/2011 |
| CN | 106649762 | | 5/2017 |
| CN | 106649762 A | * | 5/2017 |
| CN | 107025297 | | 8/2017 |
| CN | 107025297 A | * | 8/2017 |

OTHER PUBLICATIONS

First Chinese Office Action dated Mar. 20, 2019, for priority Chinese Patent Application No. 201710928258.1.
Notification to Grant Patent Right for Invention dated Sep. 4, 2019, for priority Chinese Patent Application No. 201710928258.1.

* cited by examiner

SEMANTIC RECOGNITION METHOD, ELECTRONIC DEVICE, AND COMPUTER-READABLE STORAGE MEDIUM

This present disclosure declares priority of the Chinese patent application No. 201710928258.1, filed on Sep. 30, 2017, entitled "Semantic recognition method, electronic device and computer-readable storage medium". Entire content of the Chinese patent application is incorporated in the present disclosure by reference.

BACKGROUND

Technical Field

The present disclosure relates to a field of intention recognition, in particular to a semantic recognition method, electronic device, and computer-readable storage medium.

Background Information

With the rapid development of the Internet and the improvement of people's service consciousness, network customer service has been popularized to all walks of life, and even to every link of daily business service.

At present, common network customer service is usually composed of intelligent service robot and manual customer service, wherein the intelligent service robot locates customer's problems through semantic analysis, so that a conversation between the intelligent service robot and a customer being natural as a conversation between the customer and a natural person, and solutions corresponding to special domain problems are obtained through different expressions in a natural interaction. Compared with a traditional customer service mode, the intelligent customer service robot can realize all day service in day and night even at holidays, which diverts a burden of the manual customer service, thus operating costs of an enterprise customer service can be effectively reduced.

Though the intelligent customer service robot can give a fast-respond to customer's needs in a certain degree, generally customers respond that the intelligent customer service robot is "stupid", and it often can not accurately identify customers' meaning. when there are few keywords in customer problem, the intelligent customer service robot usually show a low relevant answer or directly show words "can not answer".

Therefore, the existing intelligent customer service robot is still difficult to effectively meet the customer service needs and customer experience is generally poor. Many customers prefer choosing the manual customer service rather than the intelligent customer service robot, which causes the intelligent customer service robot being in a low utilization rate and incompetent to alleviate pressure of the manual customer service.

SUMMARY

Technical problem to be solved by the present disclosure is to overcome the problem that the intelligent customer service robot is unable to accurately identify the customer's intention in the prior art. This disclosure presents a semantic recognition method, an electronic device and a computer-readable storage medium. By dividing the customer's question into several morphemes, when the customer's question is lack of morphemes, the intention of the customer's questions can be accurately identified through the way of further questioning.

To solve the problems, the present disclosure provides a semantic recognition method, comprising the following steps: S1, constructing a morpheme database, wherein the morpheme database stores a number of question-answer pairs for constructing intelligent interlocutions, the question is a word sequence consisted of a number of key words, the word sequence is expressed by a directional association among multiple morphemes, and the same key words in multiple word sequences are associated by the same morpheme; S2, constructing a synonym database, wherein the synonym database stores a number of word groups consisted of synonyms of standard words associated with the standard words, wherein the standard words correspond to morphemes of the morpheme database; S3, receiving a service session request of a customer, and creating a customer service session with the customer; S4, analyzing contents of the customer service session to obtain a word sequence which only contains the standard words for expressing the customer service session; S5, determining a missing morpheme in the word sequence which only contains the standard words, and asking the customer a further question to obtain a completely expressed word sequence which only contains the standard words; S6, according to the completely expressed word sequence which only contains the standard words, finding out a matched answer from the morpheme database and sending the matched answer to the customer.

The present disclosure also provides an electronic device comprising a memory and a processor, wherein a semantic recognition system which can be executed by the processor is stored in the memory, wherein the semantic recognition system comprises: a morpheme database, wherein the morpheme database stores a number of question-answer pairs for constructing intelligent interlocutions, the question is a word sequence consisted of a number of key words, the word sequence is expressed by a directional association among multiple morphemes, and the same key words in multiple word sequences are associated by the same morpheme; a synonym database, wherein the synonym database stores a number of word groups consisted of synonyms of standard words associated with the standard words, wherein the standard words correspond to morphemes of the morpheme database; a session connection module, configured to receive a service session request of a customer, and create a customer service session with the customer; a session analyzing module, configured to analyze contents of the customer service session to obtain a word sequence which only contains the standard words for expressing the customer service session; a detailed inquiry module, configured to determine a missing morpheme in the word sequence which only contains the standard words, and ask the customer a further question to obtain a completely expressed word sequence which only contains the standard words; an answer matching module, configured to, according to the completely expressed word sequence which only contains the standard words, find out a matched answer from the morpheme database and send the matched answer to the customer.

To achieve above object, the present disclosure also provides a computer-readable storage medium in which a semantic recognition system is stored, and the semantic recognition system can be executed by at least one processor, to course the at least one processor to perform following steps: S1, constructing a morpheme database, wherein the morpheme database stores a number of question-answer pairs for constructing intelligent interlocutions, the question is a word sequence consisted of a number of key words, the word sequence is expressed by a directional association among multiple morphemes, and the same key words in multiple word sequences are associated by the same morpheme; S2, constructing a synonym database, wherein the synonym database stores a number of word groups consisted of synonyms of standard words associated with the standard words, wherein the standard words correspond to morphemes of the morpheme database; S3, receiving a service session request of a customer, and creating a customer service session with the customer; S4, analyzing contents of the customer service session to obtain a word sequence which only contains the standard words for expressing the customer service session; S5, determining a missing morpheme in the word sequence which only contains the standard words, and asking the customer a further question to obtain a completely expressed word sequence which only contains the standard words; S6, according to the completely expressed word sequence which only contains the standard words, finding out a matched answer from the morpheme database and sending the matched answer to the customer.

Positive effects of the present disclosure lie in that the present disclosure obtains a fully expressed question by determining the missing morpheme in the customer's question and then asking the customer a further question, so as to accurately identify the intention of the customer's question and send the answer what the customer wants to the customer.

DETAILED DESCRIPTION

The present disclosure will be further described in the way of embodiments, but it is not limited to the scope of the embodiments.

Firstly, the present disclosure provides an electronic device.

Figure 1:
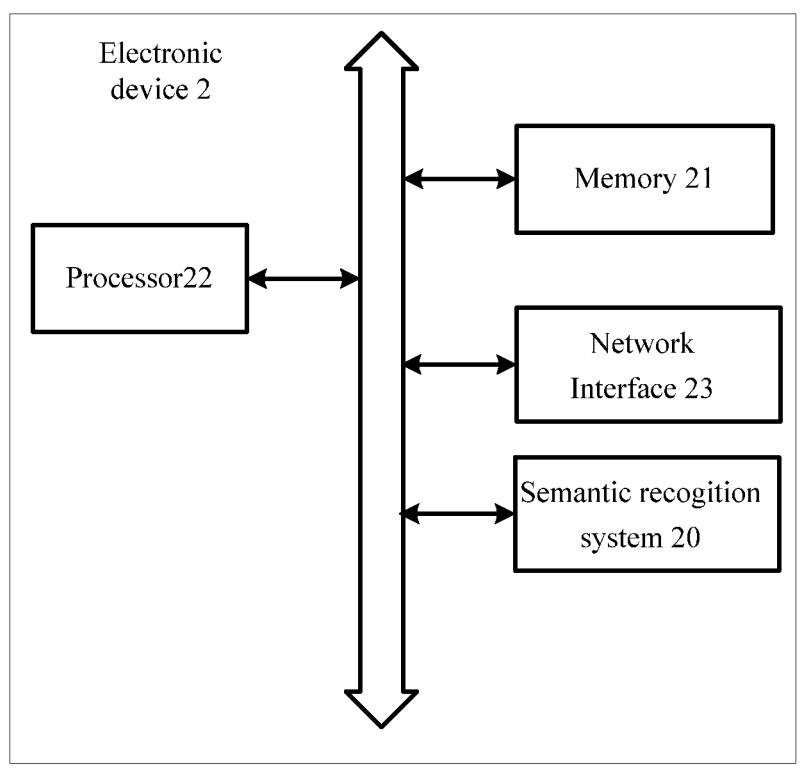
FIG. 1 illustrates a diagram of hardware architecture of an electronic device according to an embodiment of the present disclosure.

Referring to FIG. 1, illustrates a diagram of hardware architecture of an electronic device according to an embodiment of the present disclosure. In this embodiment, a electronic device 2 is a device capable of automatically performing numerical calculations and/or information processing according to predefined or stored instructions. For example, it can be a smart phone, tablet, laptop, desktop computer, rack server, blade server, tower server, or cabinet server (including stand-alone servers. or a cluster of multiple servers), and so on. As shown, the electronic device 2 includes, but is not limited to, a memory 21, a processor 22, a network interface 23, ID card identification instrument 24, high camera 25 and the a semantic recognition system 20 that can be communicated with each other through a system bus, in which:

The memory 21 includes at least one type of computer-readable storage medium. The readable storage medium includes flash memory, hard disk, multimedia card, card type memory (e.g., SD or DX memory, etc.), random access memory (RAM), static random access memory (SRAM), read only memory (ROM), electrically erasable. Programmable read-only memory (EEPROM), programmable read-only memory (PROM), magnetic memory, magnetic disk, optical disk, etc. In some embodiments the memory 21 may be an internal storage module of the electronic device 2 such as a hard disk or memory of the electronic device 2. In other embodiments, the memory 21 may also be an external storage device of the electronic device 2, such as a plugged hard disk provided on the electronic device 2, an intelligent memory card (Smart Media Card, SMC), secure digital (Secure Digital, SD) card, a flash memory card (Flash Card), and the like. Of course the memory 21 may also include both an internal storage module and an external storage device of the electronic device 2. In this embodiment, the memory 21 is generally used to store an operating system and various types of application software installed in the electronic device 2 such as the program code of the semantic recognition system 20 and the like. In addition, the memory 21 may also be used to temporarily store various types of data that have been or will be outputted.

The processor 22 may in some embodiments be a central processor (CPU), a controller, a microprocessor, or other data processing chip. The processor 22 is generally used to control the overall operation of the electronic device 2 such as performing control and processing related to data interaction or communication with the electronic device 2. In this embodiment, the processor 22 is used to run program code stored in the memory 21 or process data such as running the semantic recognition system 20 or the like.

The network interface 23 may include a wireless network interface or a wired network interface which is generally used to establish a communication connection between the electronic device 2 and other electronic devices. For example, the network interface 23 is used for connecting the electronic device 2 to an external terminal via a network establishing a data transmission channel and a communication connection between the electronic device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 1 shows only an electronic device having components 21-23 but it is understood that it is not required to implement all of the shown components and that more or fewer parts can be implemented in lieu thereof.

In this embodiment, the semantic recognition system 20 stored in memory 21 may also be divided into one or more program modules, said one or more program modules being stored in memory 21, and executed by one or more processors (in this embodiment, processor 22) to complete the application.

Figure 2:
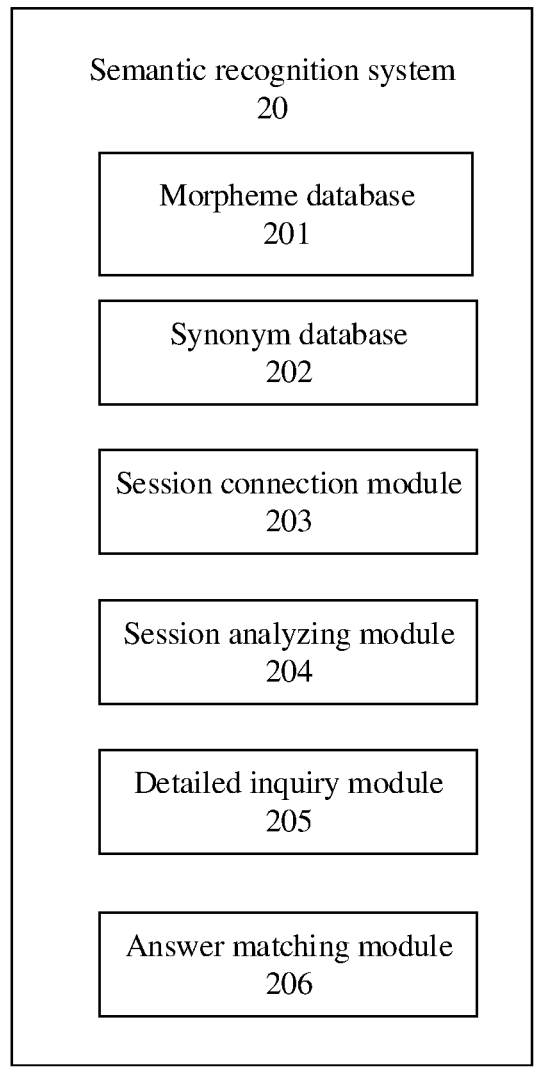
FIG. 2 illustrates a block diagram of program modules of a semantic recognition system of the electronic device according to an embodiment of the present disclosure.

For example, FIG. 2 illustrates block diagram of program modules of the semantic recognition system 20 according to an embodiment of the present disclosure. In this embodiment, the semantic recognition system 20 may be divided into a morpheme database 201, a synonym database 202, a session connection module 203, a session analyzing module 204, a detailed inquiry module 205, and an answer matching module 206. The program module referred to in the present disclosure refers to a series of computer program instruction segments capable of accomplishing a specific function, and is more suitable than a program to describe the execution process of the semantic recognition system 20 in the electronic device 2. The following descriptions will introduce in detail the functions of each program module in this embodiment.

The morpheme database module 201, configured to construct a morpheme database, wherein the morpheme database stores a number of question-answer pairs for constructing intelligent interlocutions, the question is a word sequence consisted of a number of key words, the word sequence is expressed by a directional association among multiple morphemes, and the same key words in multiple word sequences are associated by the same morpheme.

The synonym database module 202 is configured to construct a synonym database, wherein the synonym database stores a number of word groups consisted of synonyms of standard words associated with the standard words, wherein the standard words correspond to morphemes of the morpheme database.

The session connection module 203 is configured to receive a service session request of a customer, and create a customer service session with the customer.

The session analyzing module 204 is configured to analyze contents of the customer service session to obtain a word sequence which only contains the standard words for expressing the customer service session.

The detailed inquiry module 205 is configured to determine a missing morpheme in the word sequence which only contains the standard words, and ask the customer a further question to obtain a completely expressed word sequence which only contains the standard words;

The answer matching module 206 is configured to, according to the completely expressed word sequence which only contains the standard words, find out a matched answer from the morpheme database and send the matched answer to the customer.

The semantic recognition system 20 in this embodiment can further inquire the customer's intention through asking the customer about missing part when the question of customer is incomplete, so as to improve an accuracy of answer pushing. The following taking a customer asking a question about credit card as an example to explain.

1. Establishing a service session with the customer through the session connection module and receiving the customer's question.

2. Analyzing contents of the customer service session on real-time through the session analysis module. When the customer inputs words "credit card automatic repayment", "credit card automatic repay money" are split into a word sequence "'credit card', 'automatic', 'repay money'" composed of key words. Then determining whether the key words in the word sequence belong to standard words in the synonym database. If the key words are non-standard words, the key words are replaced with the standard words associated with the key words, the non-standard word "repay money" is replaced with the standard word "repayment" here.

3. Asking the customer about the missing part of the question through the detailed inquiry module. The question can be "what do you want to inquire about automatic repayment of credit card?". Receiving the customer's answer, such as "how to handle", to obtain the customer's complete intention, that is, "how to handle the automatic repayment of the credit card?".

4. Through the answer matching module, finding out matching answers of the question selected by the customer from the morpheme database and pushing the matching answers to the customer.

In this embodiment, standard word database and the synonym database are pre-maintained in the semantic recognition system, and the standard word database and the synonym database can be modified and added according to different situations.

Secondly, a semantic recognition method is proposed in the disclosure.

Figure 3:
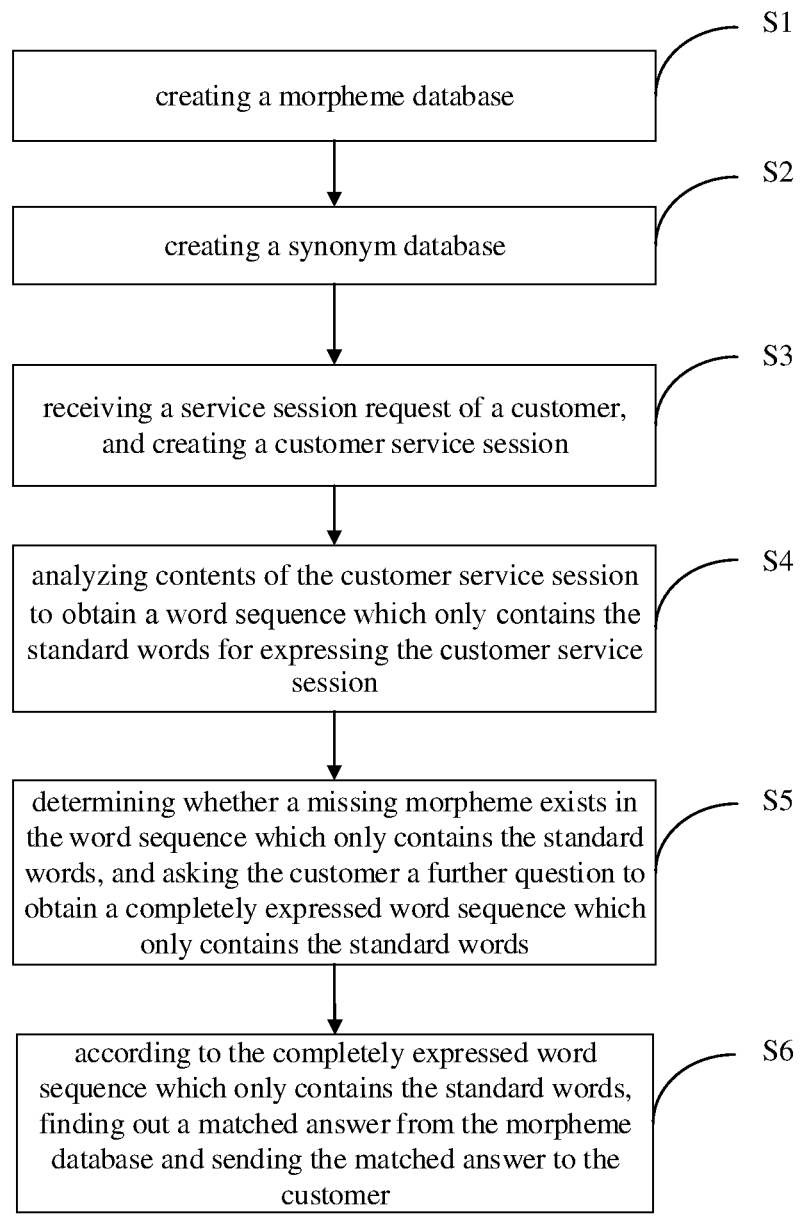
FIG. 3 illustrates a flowchart of a semantic recognition method according to a first embodiment of the present disclosure.

In a first embodiment, referring to FIG. 3, which illustrates a semantic recognition method, comprising the following steps:

S1, constructing a morpheme database, wherein the morpheme database stores a number of question-answer pairs for constructing intelligent interlocutions, the question is a word sequence consisted of a number of key words, the word sequence is expressed by a directional association among multiple morphemes, and the same key words in multiple word sequences are associated by the same morpheme;

S2, constructing a synonym database, wherein the synonym database stores a number of word groups consisted of synonyms of standard words associated with the standard words, wherein the standard words correspond to morphemes of the morpheme database;

S3, receiving a service session request of a customer, and creating a customer service session with the customer;

S4, analyzing contents of the customer service session to obtain a word sequence which only contains the standard words for expressing the customer service session;

S5, determining a missing morpheme in the word sequence which only contains the standard words, and asking the customer a further question to obtain a completely expressed word sequence which only contains the standard words;

S6, according to the completely expressed word sequence which only contains the standard words, finding out a matched answer from the morpheme database and sending the matched answer to the customer.

It should be noted that the constructing a morpheme database in S1 and the constructing a synonym database in S2 are pre-maintained in the semantic recognition system, and it is no need to be maintained every time when using, as long as content of the morpheme database and/or the synonym database needs to be updated. Maintenance way of the morpheme database and/or the synonym database can be manual maintenance, automatic maintenance after the semantic recognition system grabbing information, or the combination of the manual maintenance and the automatic maintenance.

Figure 4:
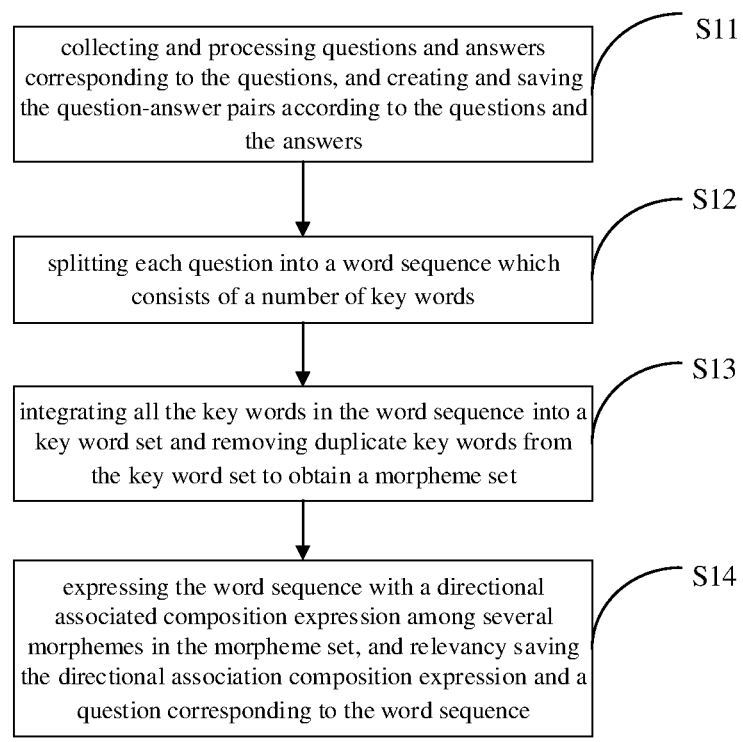
FIG. 4 illustrates a flowchart of constructing a standard knowledge database of the semantic recognition method according to a second embodiment of the present disclosure.

Basing on the first embodiment, in a second embodiment, referring to FIG. 4, S1 includes the following sub-steps:

collecting and processing questions and answers corresponding to the questions, and constructing and saving the question-answer pairs according to the questions and the answers;

S12, splitting each question into a word sequence which consists of a number of key words;

S13, integrating all the key words in the word sequence into a key word set and removing duplicate key words from the key word set to obtain a morpheme set;

S14, expressing the word sequence with a directional associated composition expression among several morphemes in the morpheme set, and relevancy saving the directional association composition expression and a question corresponding to the word sequence.

Taking a maintenance of the credit card as an example to explain a constructing process of the standard knowledge database at below:

Standard question 1: how to apply for automatic credit card repayment?

Standard question 2: how to deal with the insufficient balance of credit card automatic repayment debit card?

Standard question 3: how to set an automatic repayment date of credit card?

Searching a corresponding answer of three standard questions, and each standard question and the corresponding answer are constructed into standard question-answer pairs and saving the standard question-answer pairs in the standard knowledge database.

Splitting the three standard questions into the word sequences separately: "'how', 'to', 'apply', 'for', 'automatic', 'repayment', 'of', 'credit card'", "'how', 'to', 'deal with', 'insufficient', 'balance', 'of', 'debit card', 'for', 'automatic', 'repayment', ' of', 'credit card'" and "'how', 'to', 'set', 'automatic', 'repayment', 'date', 'of', 'to', 'credit card'".

Removing stop words from the word sequences, and generating three groups of word sequences composed of several key words. The word sequences include "deal with credit card automatic repayment", "credit card automatic repayment insufficient balance" and "set credit card automatic repayment date". Then, removing the same key words from the three groups of word sequences, and getting a morpheme set "deal with credit card automatic repayment balance insufficient set date".

Figure 5:
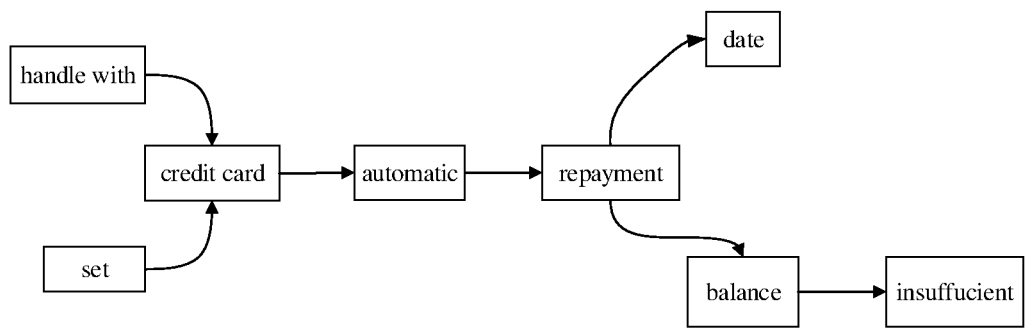
FIG. 5 illustrates a flowchart of directional associated morpheme of the semantic recognition method according to the second embodiment of the present disclosure.

Expressing the word sequence with directional associated composition expressions among several morphemes from the morpheme set. The directional relationship among the morphemes is: the "handle with" and the "set" both point to the "credit card", the "credit card" points to the "automatic", the "automatic" points to the "repayment", the "repayment" points to the "date" and the "balance", and the "balance" points to the "insufficient" (as shown in FIG. 5). The composition expressions are respectively "deal with credit card automatic repayment", "credit card automatic repayment balance insufficient" and "set credit card automatic repayment date". These expressions are associated with their corresponding standard problems and saved associatively in the standard knowledge database.

It should be noted that the morphemes in this embodiment are sorted into three types: verbs, nouns and professional nouns, and each expression of the word sequence contains at least one morpheme corresponding to each type of the morphemes.

Figure 6:
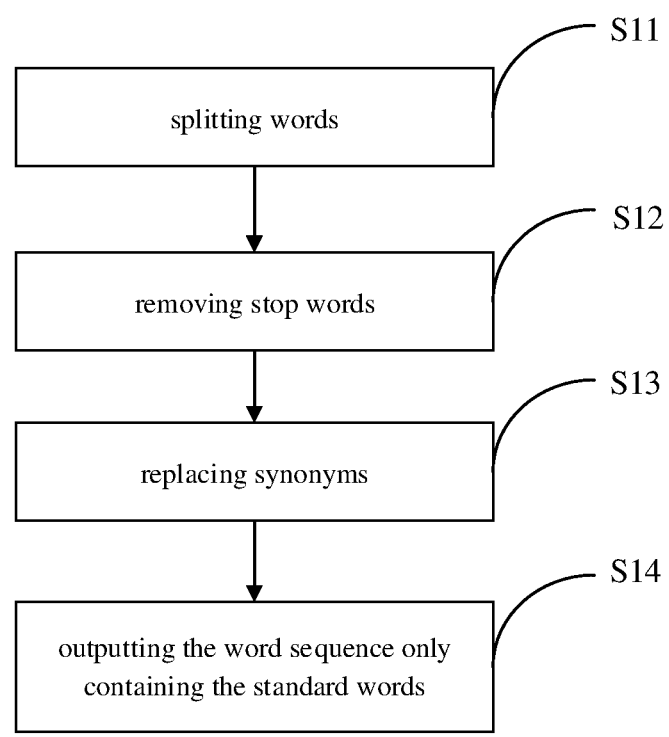
FIG. 6 illustrates a flowchart of session analyzing of the semantic recognition method according to a third embodiment of the present disclosure.

Basing on the second embodiment, in a third embodiment, referring to FIG. 6, S4 comprises the following sub-steps:

S41, splitting words: splitting the contents of the customer service session into a word sequence which consists of a number of words;

S42, removing stop words: removing the stop words of the word sequence to obtain a word sequence which only contains key words.

S43, replacing synonyms: determining whether the key words in the word sequence belongs to the standard words of the synonym database, if not, replacing the key words with the standard words;

S44, outputting the word sequence only containing the standard words.

As the above example, taking the customer input the question of "automatic repay money of credit card" as an example to specify the process of conversation analysis:

1. Splitting the customer's question "automatic repay money by credit card" into a word sequence of "'credit card' 'automatic' 'repay money'".

2. Extracting key words "credit card", "automatic", and "repay money" from the word sequence.

3. Replacing the "repay money" with "repayment" in the above-mentioned word sequence which only contains key words to generate a word sequence of "'credit card', 'automatic', 'repayment'" which only contains the standard words.

4. Outputting the word sequence of "'credit card', 'automatic', 'repayment'".

Figure 7:
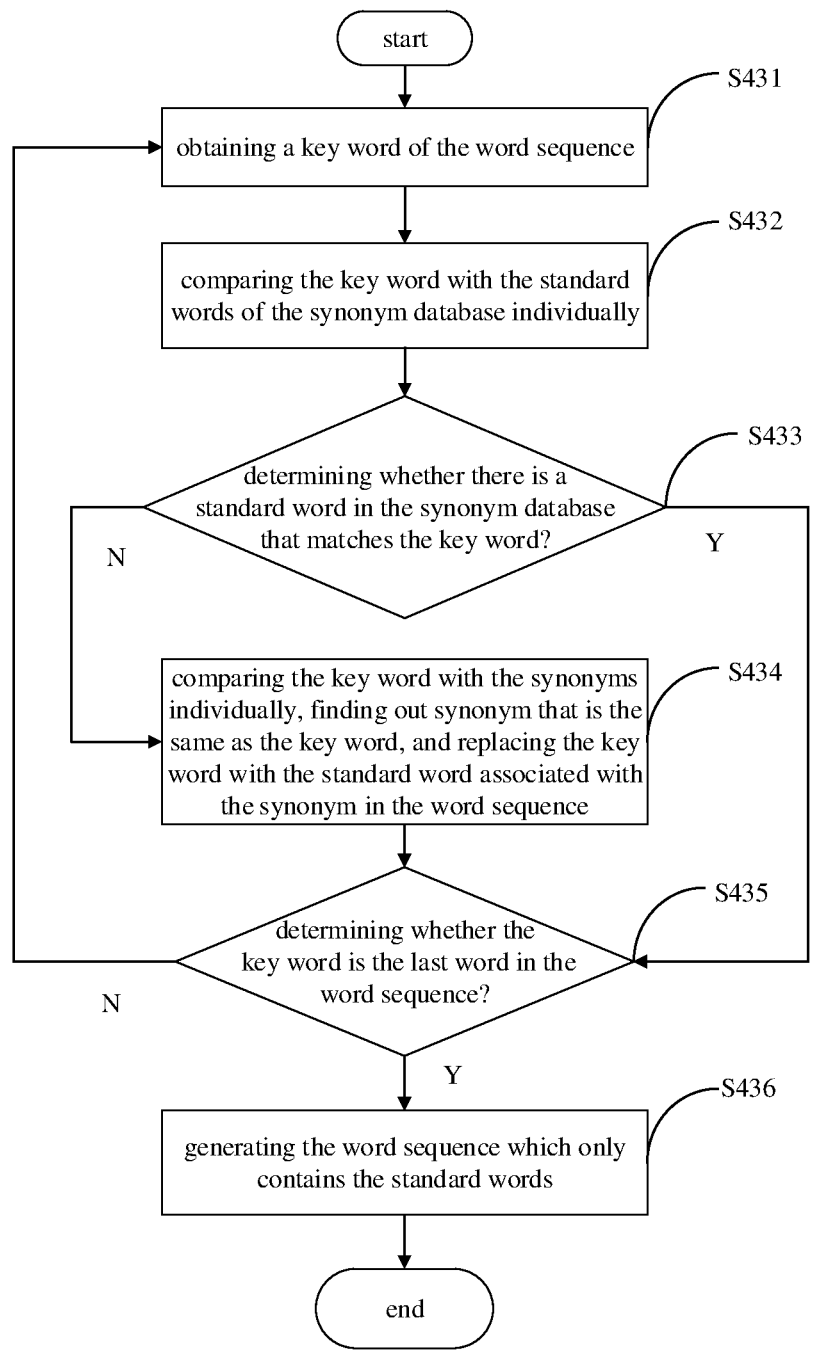
FIG. 7 illustrates a flowchart of synonym replacing of the session analyzing of the semantic recognition method according to a fourth embodiment of the present disclosure.

Basing on the third embodiment, in a fourth embodiment, referring to FIG. 7, S43 comprises the following sub-steps:

S431, obtaining a key word of the word sequence;

S432, comparing the key word with the standard words of the synonym database individually;

S433, determining whether there is a standard word in the synonym database that matches the key word, if so, S435 is executed, if not, S434 is executed;

S434, comparing the key word with the synonyms individually, finding out synonym that is the same as the key word, and replacing the key word with the standard word associated with the synonym in the word sequence;

S435, determining whether the key word is the last word in the word sequence, if so, S436 is executed; if not, S431 is executed;

S436, generating the word sequence which only contains the standard words.

As the above example, taking a synonym replacement of a simplified word sequence of "'credit card' 'automatic' 'repay money'" as an example to explain the replacement process in detail:

Obtaining a first keyword "credit card" in the word sequence of "'credit card' 'automatic' 'repay money'" which only contains key words;

Comparing the keyword of "credit card" with the standard words in the synonym database to find the same word;

determining that the key word of "credit card" is not the last word in the word sequence of "'credit card' 'automatic' 'repay money'";

Obtaining a second keyword of "automatic" in the word sequence of "'credit card' 'automatic' 'repay money'" which only contains the key words, and repeating the previous step;

Obtaining a third key word of "repay money" in the word sequence of "'credit card' 'automatic' 'repay money'" which only contains the key words;

Comparing the key word of "repay money" with the standard words in the synonym database, a comparison result is that no word is found;

Comparing the key word of "repay money" with the synonyms in the synonym database, a comparison result is that the word of "repay money" is found, and replacing the key word of "repay money" in the word sequence which only contains the key words with the standard word of "repayment" associated with the word of "repay money";

Determining that the key word of "repay money" is the last word in the word sequence of "'credit card' 'automatic' 'repay money'";

Generating the word sequence of "'credit card' 'automatic' 'repayment'" which only contains the standard words.

Figure 8:
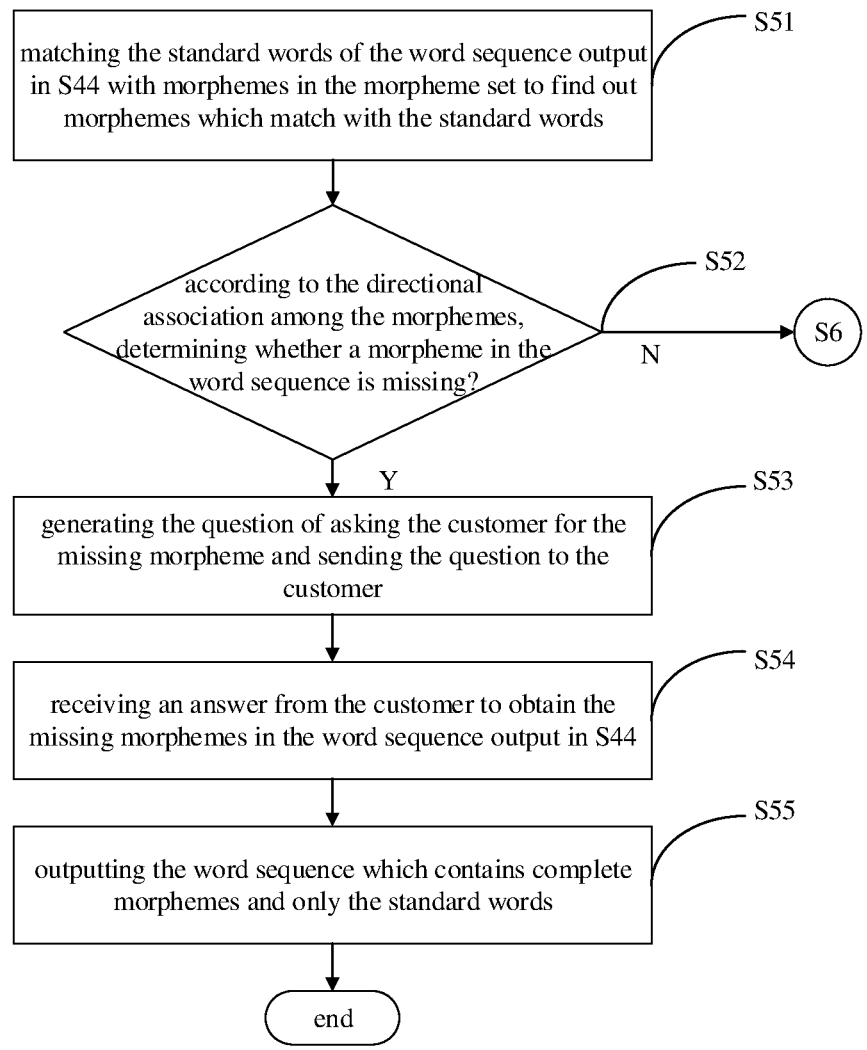
FIG. 8 illustrates a flowchart of further questioning morphemes of the semantic recognition method according to a fifth embodiment of the present disclosure.

Basing on the fourth embodiment, in a fifth embodiment, referring to FIG. 8, S5 comprises the following sub-steps:

S51, matching the standard words of the word sequence output in S44 with morphemes in the morpheme set to find out morphemes which match with the standard words;

S52, according to the directional association among the morphemes, determining whether a morpheme in the word sequence is missing, if so, S53 is executed, if not, implement S6 is executed;

S53, generating the question of asking the customer for the missing morpheme and sending the question to the customer;

S54, receiving an answer from the customer to obtain the missing morphemes in the word sequence output in S44;

S55, outputting the word sequence which contains complete morphemes and only the standard words.

As the above example, taking the customer's question of "automatic repay money of credit card" as an example to explain a process of morpheme complement:

1. When the customer problem is "credit card auto repayment", the word sequence of "'credit card' 'automatic' 'repayment'" is output after S44. Matching each standard word in the word sequence with each morpheme in the morpheme set to find matching morphemes including "credit card", "automatic", and "repayment".

2. There are three different standard questions, according to directional associations among the three morphemes of "credit card", "automatic" and "repayment". Different directional associations lack different morphemes, such as a verb morpheme of "handle with", a verb morpheme of "set" and a noun morpheme of "date", etc.

3. Generating pushing questions, such as the pushing questions are "do you want to apply for automatic repayment of credit card" or "do you want to set automatic repayment date of credit card" or "do you want to inquiry if the balance of debit card is insufficient for automatic repayment of credit card?".

4. Receiving the customer's answer and filling the missing morpheme according to the customer's answer. For example, the first question is chosen by the customer, that is, the filling morpheme is "handle with".

5. Outputting the word sequence of "'handle with' 'credit card' 'automatic' 'repayment'" with complete morphemes and only standard words.

It should be noted that the questions of asking the customer for the missing morpheme comprise enumeration question and open question. When there are more than three possible related questions, the open question is recommended; when there are less than or equal to three related questions, enumeration question is recommended. In this example, there are only three related standard questions, so a way of the enumeration question is adopted.

Basing on the fifth embodiment, in a sixth embodiment, S6 comprises the following sub-steps:

S61, comparing the word sequence output in S55 with the word sequences of the morpheme database to find out the question which matches the word sequence of the morpheme database;

S62, sending the matched answer corresponding to the question to the customer.

As the above example, taking the word sequence of "'handle with' 'credit card' 'automatic' 'repayment'" in S55 as an example to explain in detail:

1. Comparing the word sequence of "'handle with' 'credit card' 'automatic' 'repayment'" with the word sequence in the morpheme knowledge database individually, a problem of matching the same word sequence is "how to apply for automatic credit card repayment?".

2. Sending the answer corresponding to the question "how to apply for automatic credit card repayment" to the customer.

In addition, this embodiment provides a computer-readable storage medium. The semantic recognition system 20 is stored in the computer-readable storage medium. When the semantic recognition system 20 is executed by one or more processors, the semantic recognition system 20 realizes the operation of the semantic recognition method or the electronic device.

Although the specific embodiments of the application are described above, it should be understood by those skilled in the art that this is only an example, and the scope of protection of the application is limited by the claims. Those skilled in the art may make various changes or modifications to these embodiments without departing from the principles and essence of the application, but these changes and modifications fall within the scope of the protection of the application.

What is claimed is:

1. A semantic recognition method, comprising:

S1, constructing a morpheme database, wherein the morpheme database stores a number of question-answer pairs for constructing intelligent interlocutions, the question is a word sequence consisted of a number of key words, the word sequence is expressed by a directional association among multiple morphemes, and the same key words in multiple word sequences are associated by the same morpheme;

S2, constructing a synonym database, wherein the synonym database stores a number of word groups consisted of synonyms of standard words associated with the standard words, wherein the standard words correspond to morphemes of the morpheme database;

S3, receiving a service session request of a customer, and creating a customer service session with the customer;

S4, analyzing contents of the customer service session to obtain a word sequence which only contains the standard words for expressing the customer service session;

S5, determining a missing morpheme in the word sequence which only contains the standard words, and asking the customer a further question to obtain a completely expressed word sequence which only contains the standard words;

S6, according to the completely expressed word sequence which only contains the standard words, finding out a matched answer from the morpheme database and sending the matched answer to the customer.

2. The method as in claim 1, wherein S1 comprises the following sub-steps:
- S11, collecting and processing questions and answers corresponding to the questions, and constructing and saving the question-answer pairs according to the questions and the answers;
- S12, splitting each question into a word sequence which consists of a number of key words;
- S13, integrating all the key words in the word sequence into a key word set and removing duplicate key words from the key word set to obtain a morpheme set;
- S14, expressing the word sequence with a directional associated composition expression among several morphemes in the morpheme set, and relevancy saving the directional association composition expression and a question corresponding to the word sequence.

3. The method as in claim 2, wherein the morphemes are sorted into three types: verbs, nouns and professional nouns, each expression of the word sequence contains at least one morpheme corresponding to each type of the morphemes.

4. The method as in claim 2, wherein S4 comprises the following sub-steps:
- S41, splitting words: splitting the contents of the customer service session into a word sequence which consists of a number of words;
- S42, removing stop words: removing the stop words of the word sequence to obtain a word sequence which only contains key words;
- S43, replacing synonyms: determining whether the key words in the word sequence belongs to the standard words of the synonym database, if not, replacing the key words with the standard words;
- S44, outputting the word sequence only containing the standard words.

5. The method as in claim 4, wherein S43 comprises the following sub-steps:
- S431, obtaining a key word of the word sequence;
- S432, comparing the key word with the standard words of the synonym database individually;
- S433, determining whether there is a standard word in the synonym database that matches the key word, if so, S435 is executed, if not, S434 is executed;
- S434, comparing the key word with the synonyms individually, finding out synonym that is the same as the key word, and replacing the key word with the standard word associated with the synonym in the word sequence;
- S435, determining whether the key word is the last word in the word sequence, if so, S436 is executed; if not, S431 is executed;
- S436, generating the word sequence which only contains the standard words.

6. The method as in claim 4, wherein S5 comprises the following sub-steps:
- S51, matching the standard words of the word sequence output in S44 with morphemes in the morpheme set to find out morphemes which match with the standard words;
- S52, according to the directional association among the morphemes, determining whether a morpheme in the word sequence is missing, if so, S53 is executed, if not, implement S6 is executed;
- S53, generating the question of asking the customer for the missing morpheme and sending the question to the customer;
- S54, receiving an answer from the customer to obtain the missing morphemes in the word sequence output in S44;
- S55, outputting the word sequence which contains complete morphemes and only the standard words.

7. The method as in claim 6, wherein the question of asking the customer for the missing morpheme comprises enumeration question and open question.

8. The method as in claim 6, wherein S6 comprises the following sub-steps:
- S61, comparing the word sequence output in S55 with the word sequences of the morpheme database to find out the question which matches the word sequence of the morpheme database;
- S62, sending the matched answer corresponding to the question to the customer.

9. A computer-readable storage medium in which a semantic recognition system is stored, and the semantic recognition system can be executed by at least one processor, to course the at least one processor to perform following steps:
- S1, constructing a morpheme database, wherein the morpheme database stores a number of question-answer pairs for constructing intelligent interlocutions, the question is a word sequence consisted of a number of key words, the word sequence is expressed by a directional association among multiple morphemes, and the same key words in multiple word sequences are associated by the same morpheme;
- S2, constructing a synonym database, wherein the synonym database stores a number of word groups consisted of synonyms of standard words associated with the standard words, wherein the standard words correspond to morphemes of the morpheme database;
- S3, receiving a service session request of a customer, and creating a customer service session with the customer;
- S4, analyzing contents of the customer service session to obtain a word sequence which only contains the standard words for expressing the customer service session;
- S5, determining a missing morpheme in the word sequence which only contains the standard words, and asking the customer a further question to obtain a completely expressed word sequence which only contains the standard words;
- S6, according to the completely expressed word sequence which only contains the standard words, finding out a matched answer from the morpheme database and sending the matched answer to the customer.

10. The computer-readable storage medium as in claim 9, wherein S1 comprises the following sub-steps:
- S11, collecting and processing questions and answers corresponding to the questions, and constructing and saving the question-answer pairs according to the questions and the answers;
- S12, splitting each question into a word sequence which consists of a number of key words;
- S13, integrating all the key words in the word sequence into a key word set and removing duplicate key words from the key word set to obtain a morpheme set;
- S14, expressing the word sequence with a directional associated composition expression among several morphemes in the morpheme set, and relevancy saving the directional association composition expression and a question corresponding to the word sequence.

11. The computer-readable storage medium as in claim 10, wherein the morphemes are sorted into three types: verbs, nouns and professional nouns, each expression of the word sequence contains at least one morpheme corresponding to each type of the morphemes.

12. The computer-readable storage medium as in claim 10, wherein S4 comprises the following sub-steps:
    S41, splitting words: splitting the contents of the customer service session into a word sequence which consists of a number of words;
    S42, removing stop words: removing the stop words of the word sequence to obtain a word sequence which only contains key words;
    S43, replacing synonyms: determining whether the key words in the word sequence belongs to the standard words of the synonym database, if not, replacing the key words with the standard words;
    S44, outputting the word sequence only containing the standard words.

13. The computer-readable storage medium as in claim 12, wherein S43 comprises the following sub-steps:
    S431, obtaining a key word of the word sequence;
    S432, comparing the key word with the standard words of the synonym database individually;
    S433, determining whether there is a standard word in the synonym database that matches the key word, if so, S435 is executed, if not, S434 is executed;
    S434, comparing the key word with the synonyms individually, finding out synonym that is the same as the key word, and replacing the key word with the standard word associated with the synonym in the word sequence;
    S435, determining whether the key word is the last word in the word sequence, if so, S436 is executed; if not, S431 is executed;
    S436, generating the word sequence which only contains the standard words.

14. The computer-readable storage medium as in claim 12, wherein S5 the following sub-steps:
    S51, matching the standard words of the word sequence output in S44 with morphemes in the morpheme set to find out morphemes which match with the standard words;
    S52, according to the directional association among the morphemes, determining whether a morpheme in the word sequence is missing, if so, S53 is executed, if not, implement S6 is executed;
    S53, generating the question of asking the customer for the missing morpheme and sending the question to the customer;
    S54, receiving an answer from the customer to obtain the missing morphemes in the word sequence output in S44;
    S55, outputting the word sequence which contains complete morphemes and only the standard words.

15. The computer-readable storage medium as in claim 14, wherein the question of asking the customer for the missing morpheme comprises enumeration question and open question.

16. The computer-readable storage medium as in claim 14, wherein S6 comprises the following sub-steps:
    S61, comparing the word sequence output in S55 with the word sequences of the morpheme database to find out the question which matches the word sequence of the morpheme database;
    S62, sending the matched answer corresponding to the question to the customer.

* * * * *